US011910080B2

(12) United States Patent
Saito

(10) Patent No.: US 11,910,080 B2
(45) Date of Patent: Feb. 20, 2024

(54) IMAGE PICKUP APPARATUS FOR INFERRING NOISE AND LEARNING DEVICE

(71) Applicant: CANON KABUSHIKI KAISHA, Tokyo (JP)

(72) Inventor: Makiko Saito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 192 days.

(21) Appl. No.: 17/154,365

(22) Filed: Jan. 21, 2021

(65) Prior Publication Data
US 2021/0243395 A1   Aug. 5, 2021

(30) Foreign Application Priority Data

Jan. 31, 2020 (JP) ................... 2020-015074

(51) Int. Cl.
| | |
|---|---|
| *H04N 23/617* | (2023.01) |
| *G06N 20/00* | (2019.01) |
| *H04N 25/68* | (2023.01) |
| *H04N 25/70* | (2023.01) |
| *G06N 3/08* | (2023.01) |
| *H04N 23/60* | (2023.01) |
| *G06N 5/01* | (2023.01) |
| *G06N 20/10* | (2019.01) |

(52) U.S. Cl.
CPC ............ *H04N 23/617* (2023.01); *G06N 3/08* (2013.01); *G06N 20/00* (2019.01); *H04N 23/64* (2023.01); *H04N 25/68* (2023.01); *H04N 25/70* (2023.01); *G06N 5/01* (2023.01); *G06N 20/10* (2019.01)

(58) Field of Classification Search
CPC .. H04N 5/23225; H04N 5/367; H04N 5/3675; H04N 5/369; H04N 25/68; H04N 23/617; H04N 25/70; G06N 20/00; G06N 20/10; G06N 3/08; G06N 5/003; G06N 5/01
See application file for complete search history.

(56) References Cited

U.S. PATENT DOCUMENTS

| | | | |
|---|---|---|---|
| 2013/0128082 A1* | 5/2013 | Kiyosawa ............... | H04N 25/67 348/246 |
| 2013/0229550 A1* | 9/2013 | Nakao .................... | H04N 25/68 348/246 |

(Continued)

FOREIGN PATENT DOCUMENTS

JP         H0630425 A      2/1994

*Primary Examiner* — Twyler L Haskins
*Assistant Examiner* — Akshay Trehan
(74) *Attorney, Agent, or Firm* — ROSSI, KIMMS & McDOWELL LLP

(57) ABSTRACT

An image pickup apparatus includes a solid-state image pickup device, a learning unit configured to generate a learned model by performing machine learning using, as supervised data, first correction information for identifying a pixel signal for which noise is to be corrected among a plurality of pixels of the solid-state image pickup device and using, as input, an image acquired from the solid-state image pickup device and that has not been corrected based on the first correction information, and an inference unit configured to infer a pixel signal on which noise is superimposed by inputting an image corrected based on the first correction information to the learned model.

15 Claims, 8 Drawing Sheets

(56) References Cited

U.S. PATENT DOCUMENTS

2020/0351440 A1* 11/2020 Seta ................. H04N 23/661
2020/0372250 A1* 11/2020 Jiang ................. G06F 3/165
2020/0388011 A1* 12/2020 Nair .................. G06T 5/50
2020/0410253 A1* 12/2020 Ewert ................ G06V 10/82

* cited by examiner

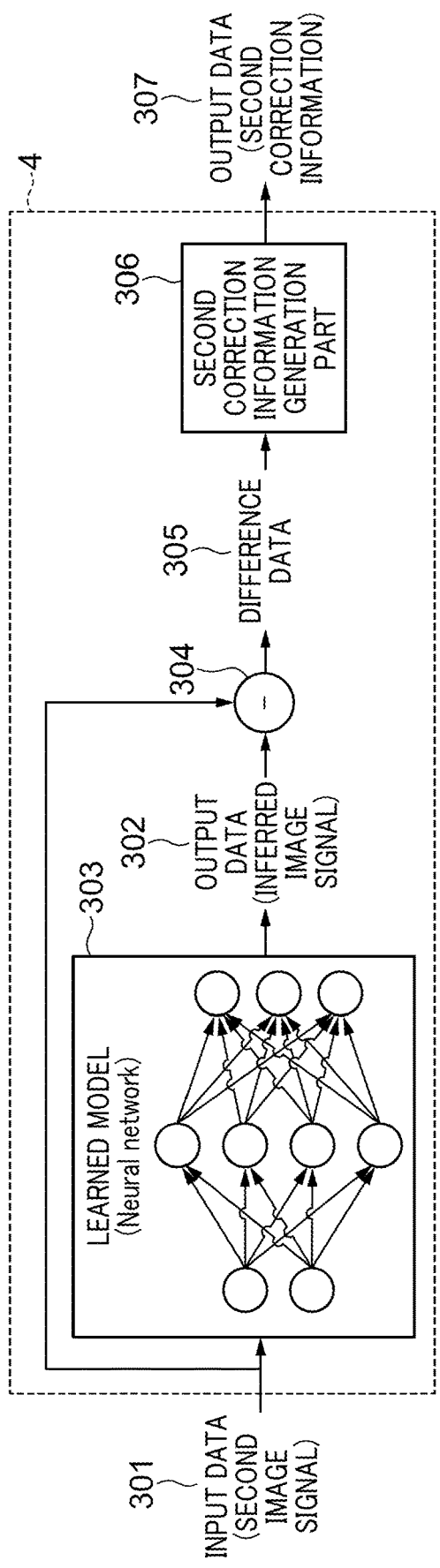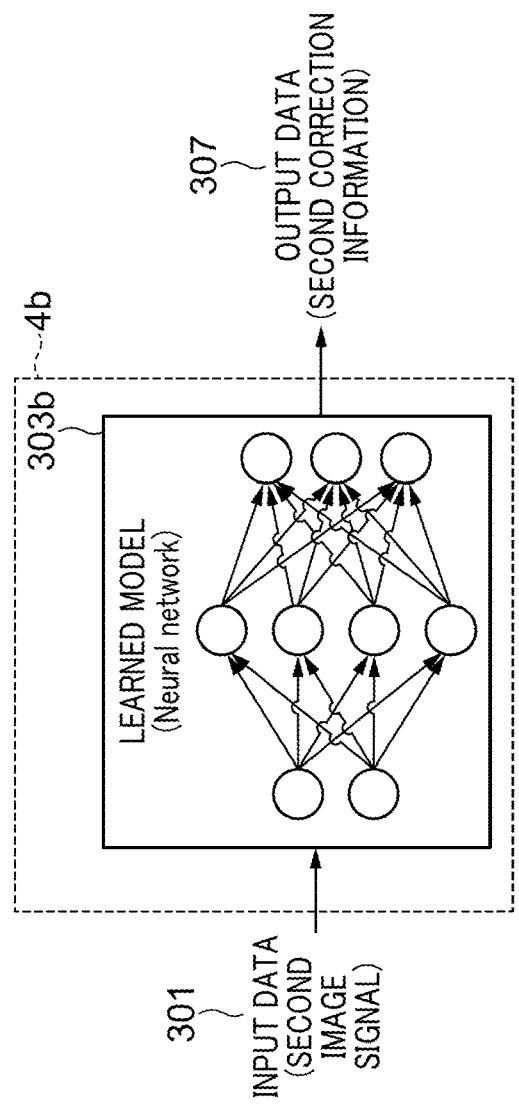

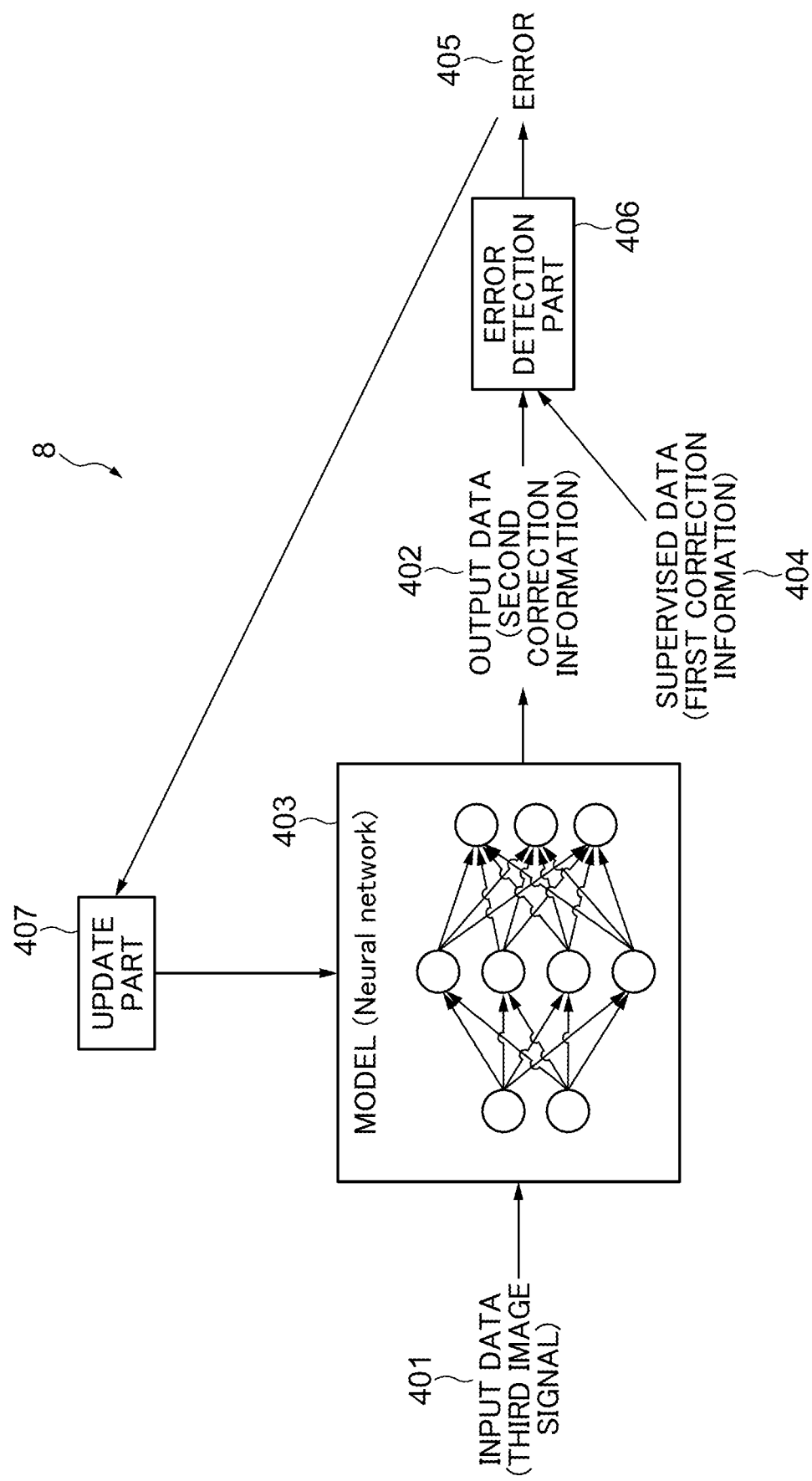

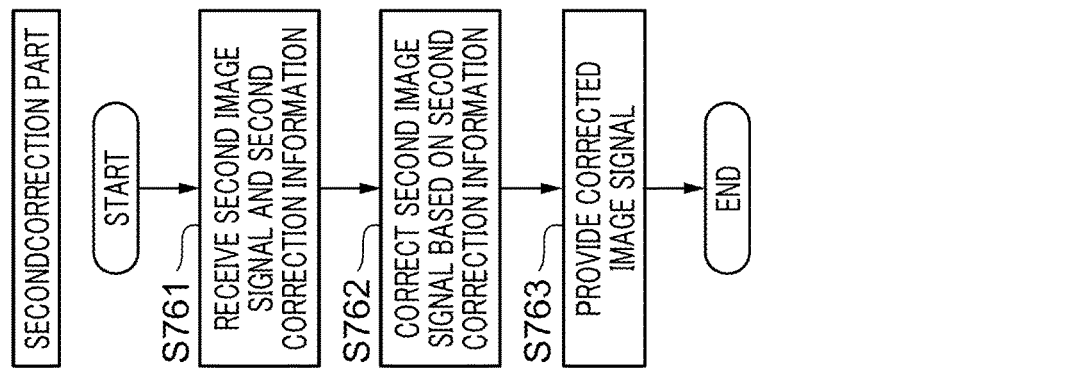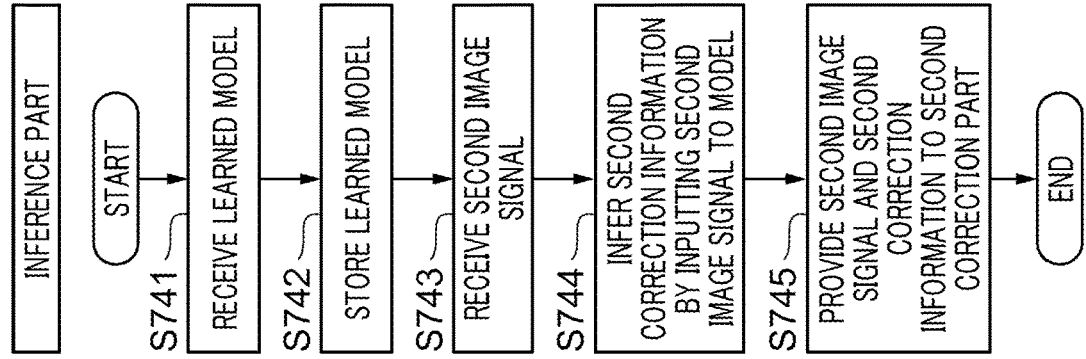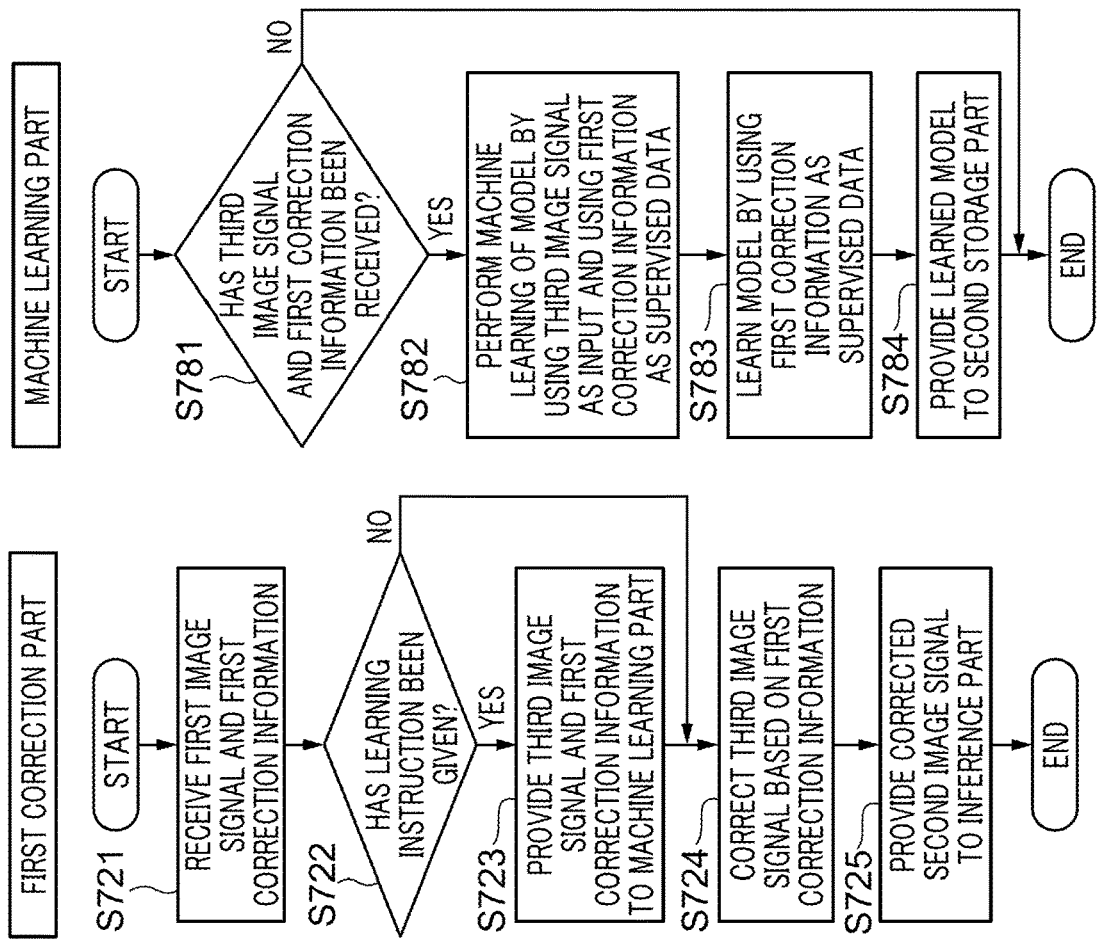

IMAGE PICKUP APPARATUS FOR INFERRING NOISE AND LEARNING DEVICE

BACKGROUND OF THE INVENTION

Field of the Invention

The present invention relates to an image pickup apparatus for inferring noise and a learning device.

Description of the Related Art

An image pickup apparatus such as a digital camera acquires an image signal by using a solid-state image pickup device. Noise caused by defects of pixels of the solid-state image pickup device or a readout circuit or noise caused by manufacturing variations may be superimposed on the acquired image signal. It is desirable to correct the noise superimposed on the image signal because the noise lowers an S/N ratio of the image signal.

One example of noise superimposed on an image signal is white pixels and black pixels caused by pixel defects of a solid-state image pickup device. As for this noise, for example, inspection for finding defective pixels is performed before shipping of an image pickup apparatus, and position information of the defective pixels is registered as correction information. Then, signals of the defective pixels are corrected by using the correction information registered in advance.

One example of noise that stochastically occurs in a pixel signal is random telegraph noise (RTN). When RTN occurs in an MOS-FET of a pixel signal readout circuit, an S/N ratio of the image signal decreases. In addition, defective pixels may occur later due to a hard error caused, for example, by radiation incident on pixels.

As a related technology, a technology of Japanese Laid-Open Patent Publication (kokai) No. H06-030425 has been proposed for the purpose of responding to a defect change caused by electrostatic breakdown and aging. The technology detects a level difference between a pixel signal of a certain pixel and a pixel signal of an adjacent pixel of the same color and makes determination based on a predetermined threshold value. Further, the technology detects defective pixels by detecting a level difference between pixel signals of different types of pixels of the same color around the certain pixel and making a determination based on a predetermined threshold value.

According to the technology of Japanese Laid-Open Patent Publication (kokai) No. H06-030425, there is a possibility of erroneous detection in a case where unknown noise that is not registered in advance in correction information such as the RTN or pixel defects that occur over time is detected from an image. For example, a high-frequency subject such as a thin line may be detected as noise, and noise may be detected as a subject.

One option to suppress erroneous detection of noise and improve detection accuracy of noise caused by unknown defective pixels is to use a learned model learned by machine learning. In this case, it is desirable to increase the number of image data for machine learning and perform machine learning by using various image data for learning. However, it is difficult to prepare a large number of image data for teaming of various kinds.

SUMMARY OF THE INVENTION

The present invention provides an image pickup apparatus including a solid-state image pickup device, at least one processor or circuit configured to function as following units; a learning unit configured to generate a learned model by performing machine learning using, as supervised data, first correction information for identifying a pixel signal for which noise is to be corrected among a plurality of pixels of the solid-state image pickup device and using, as input, an image acquired from the solid-state image pickup device and that has not been corrected based on the first correction information, and an inference unit configured to infer a pixel signal on which noise is superimposed by inputting an image corrected based on the first correction information to the learned model.

Further features of the present invention will become apparent from the following description of exemplary embodiments (with reference to the attached drawings).

BRIEF DESCRIPTION OF THE DRAWINGS

FIGS. 3A and 3B are diagrams showing flow of data input/output in an inference part.

FIG. 4 is a diagram showing flow of data input/output in a machine learning part.

FIGS. 6A to 6D are flowcharts showing flow of processing of the first correction part, the machine learning part, the inference part, and the second correction part.

DESCRIPTION OF THE EMBODIMENTS

First Embodiment

Figure 1:
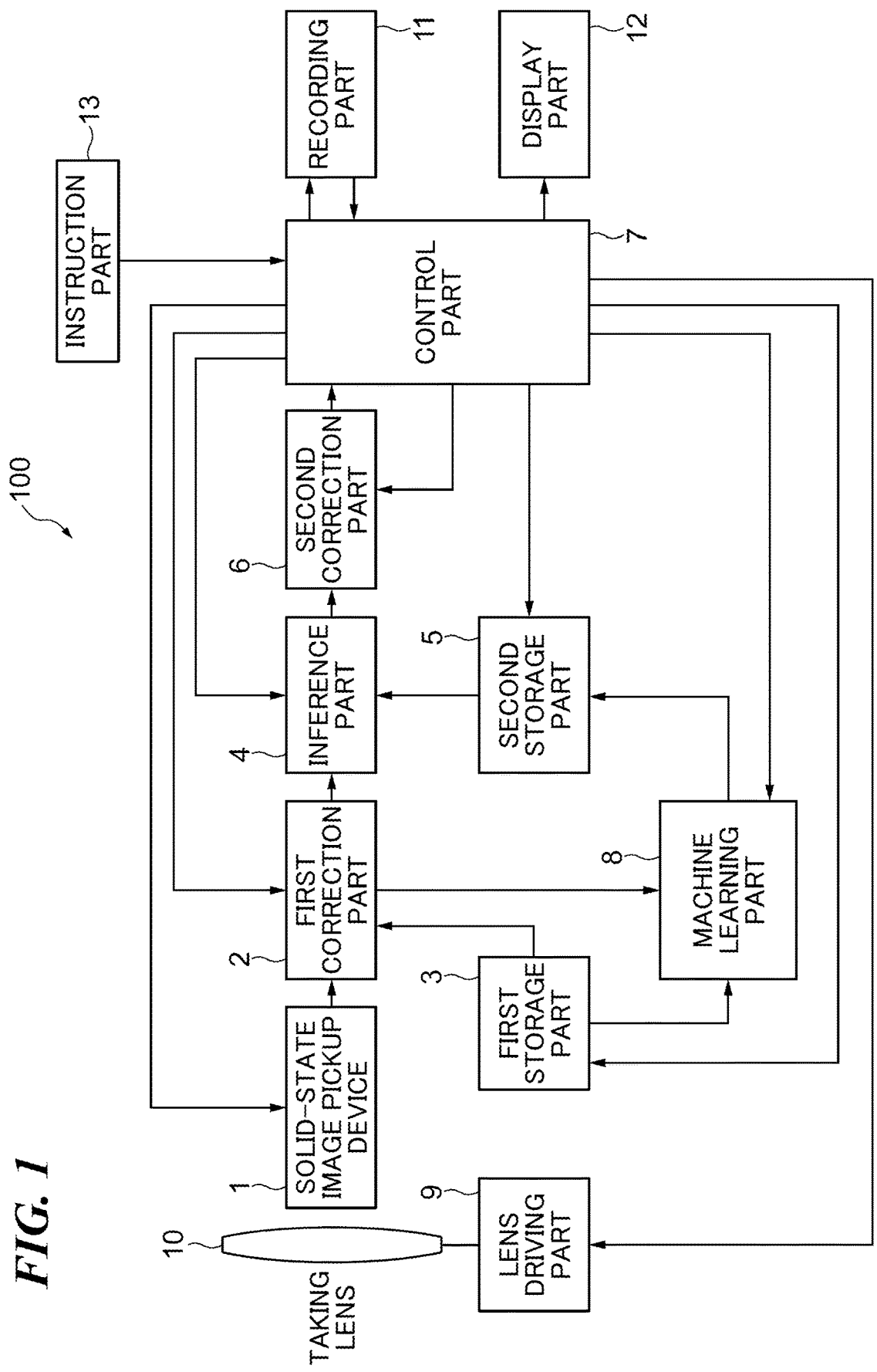
FIG. 1 is a block diagram showing a hardware configuration of the image pickup apparatus of the first embodiment.

Hereinafter, the first embodiment will be described with reference to the drawings. FIG. 1 is a block diagram showing a hardware configuration of an image pickup apparatus 100 according to the first embodiment. In the following description, it is assumed that the image pickup apparatus 100 according to the present embodiment is a digital camera including a solid-state image pickup device. However, the image pickup apparatus 100 is not limited to the example of FIG. 1. Further, the image pickup apparatus 100 may be a video camera, a smartphone, a tablet terminal, an industrial camera, a medical camera, or the like.

The image pickup apparatus 100 includes a solid-state image pickup device 1, a first correction part 2, a first storage part 3, an inference part 4, a second storage part 5, a second correction part 6, a control part 7, and a machine learning part 8. Further, the image pickup apparatus 100 includes a lens driving part 9, a taking lens 10, a recording part 11, a display part 12, and an instruction part 13. The taking lens 10 (image pickup optical system, lens unit) may be detachable from a main body of the image pickup apparatus 100 or may be undetachable. The taking lens 10 forms an optical image from a subject on an image pickup surface of the solid-state image pickup device 1.

The solid-state image pickup device 1 converts the optical image of the subject formed by the taking lens 10 into an image signal which is an electric signal according to an amount of incident light and outputs the image signal to the first correction part 2. A plurality of pixels that perform photoelectric conversion are arranged on the image pickup surface of the solid-state image pickup device 1. An electric signal corresponding to an electric charge accumulated in each pixel is read out by a readout circuit and used as an image signal.

Various kinds of noise are superimposed on a first image signal read out from the solid-state image pickup device 1 in addition to an optical signal corresponding to the subject light. For example, noise caused by defects of pixels or the readout circuit, manufacturing variations, and influence of conditions and a timing of driving of the readout circuit, (electromagnetic noise associated with operation of peripheral devices) is also superimposed on the first image signal. A cause of noise is not limited to the above examples.

Examples of a cause of noise that occurs in a pixel of the solid-state image pickup device 1 include a defect of the pixel itself such as a white pixel or a black pixel. A white pixel is a defective pixel whose pixel signal is deviated to a white side from an original signal level, and a black pixel is a defective pixel whose pixel signal is deviated to a black side from an original signal level.

Such a defective pixel outputs a pixel signal in which noise is constantly superimposed on an optical signal corresponding to a subject image. Accordingly, the signal value of the defective pixel is deviated from signal values of normal pixels around the defective pixel. This causes noise that deteriorates an S/N ratio of the image signal. The first correction part 2 corrects the noise constantly superimposed by such defective pixels.

The first storage part 3 stores therein first correction information including identification information for identifying a pixel signal to be corrected by the first correction part 2 in the first image signal. For example, inspection for finding defective pixels such as white pixels and black pixels is performed, for example, in a factory before shipping of the image pickup apparatus 100. Then, address information indicating a relative position of a defective pixel in an image signal is registered as identification information of first correction information.

Figure 2A:
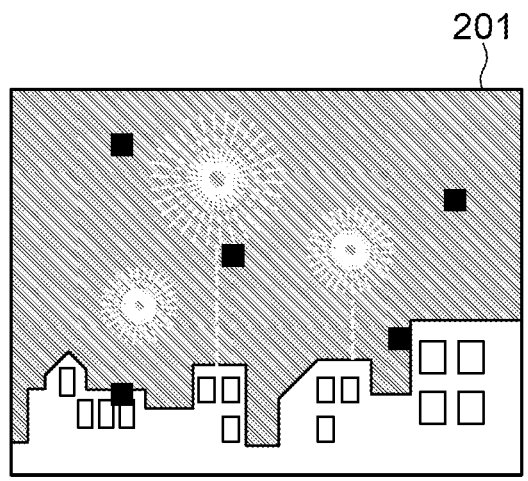
FIGS. 2A to 2C are schematic views showing first correction information.
Figure 2B:
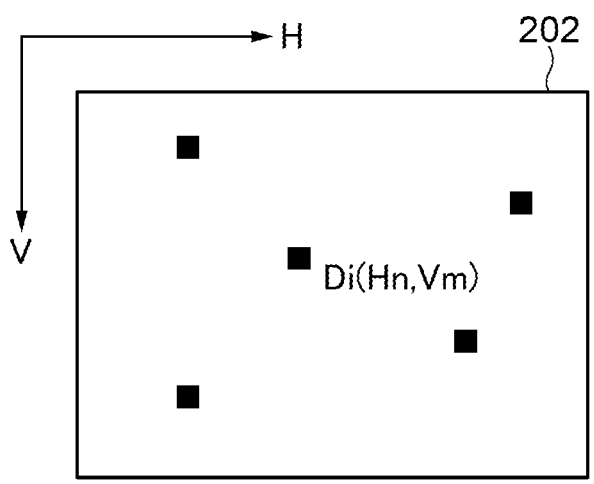
Figure 2C:
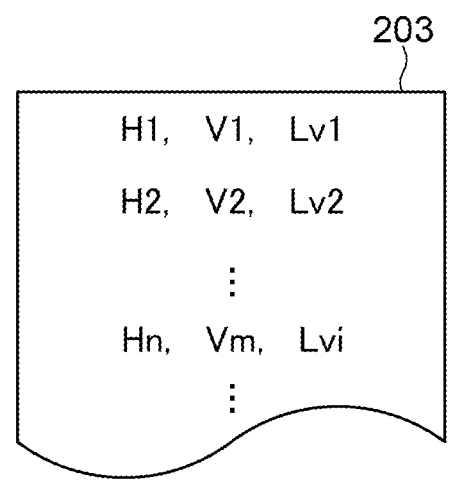
Figure 5:
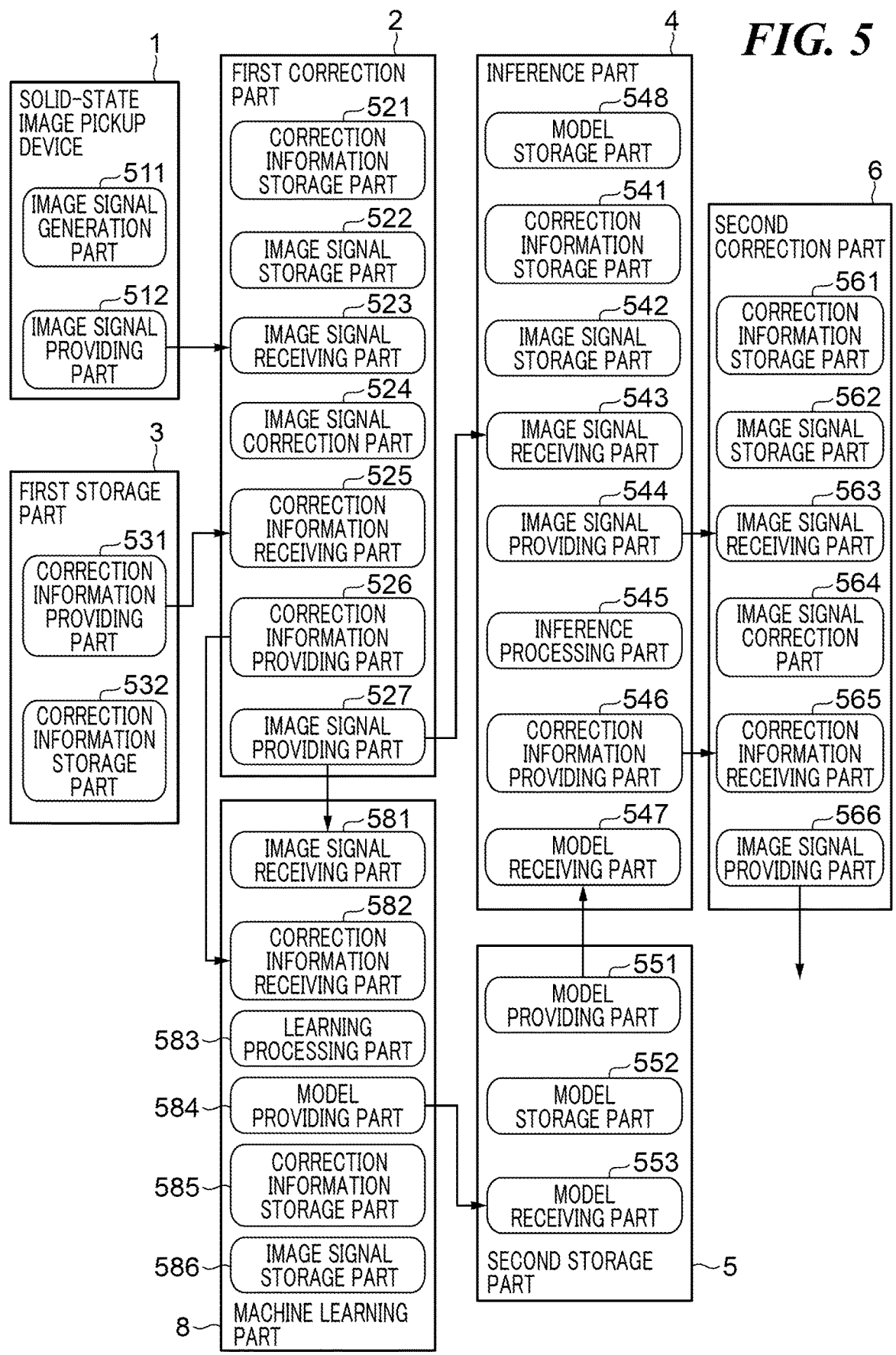
FIG. 5 is a functional block diagram showing software functions of each part of FIG. 1.

The first correction information will be described with reference to FIGS. 2A to 2C. FIGS. 2A to 2C are schematic views showing the first correction information. FIG. 2A is an example of image data 201 generated based on an image signal containing noise from a defective pixel output from a solid-state image pickup device. FIG. 2B is a diagram showing an example of inspection image data 202 for inspecting defective pixels included in the image signal 201 and addresses of the defective pixels in the inspection image data 202.

The inspection image data 202 is image data including one or more defective pixels. The inspection image data 202 is image data obtained by shooting while the solid-state image pickup device 1 is being in a shaded state or being irradiated with uniform light. In the inspection image data 202, a defective pixel signal has not been corrected.

In FIGS. 2A to 2C, an i-th defective pixel is indicated by Di, a horizontal address on the image signal is indicated by Hn, a vertical address is indicated by Vm, and a defect level indicating a noise signal amount of a defective pixel is indicated by Lvi. The values "i", "n" and "m" are natural numbers. The defective pixel Di has been already specified, and identification information for identifying the defective pixel Di is registered in the first correction information. In FIG. 2, the identification information is indicated as address information (Hn, Vm).

Note that a noise signal amount of a defective pixel differs from one pixel to another. In view of this, the address information may be registered in association with defect level information indicating a defect level Lvi indicating a noise signal amount of a defective pixel. FIG. 2C shows a defective pixel list 203 in which defect level information is associated with address information of defective pixels. A noise signal amount of a defective pixel also varies depending on an accumulation time and temperature. Therefore, the first correction part 2 may determine necessity of correction of a defective pixel in accordance with shooting conditions such as an accumulation time, a readout gain, and temperature with reference to the defect level information and correct only a pixel signal that needs to be corrected.

In FIG. 1, the first correction part 2 corrects the first image signal output by the solid-state image pickup device 1 to obtain a second image signal with reference to the first correction information stored in the first storage part 3. The first correction part 2 corrects a pixel signal of a registered defective pixel by any method such as substitution or interpolation using pixels values of peripheral pixels based on identification information included in the first correction information.

Meanwhile, noise that changes with time such as RTN and a pixel defect that occurs later may occur in the solid-state image pickup device 1, as described above. Such noise that changes with time may occur even in a pixel that is not registered in the identification information of the first correction information. Therefore, a pixel signal of the pixel in which the noise has occurred may not be corrected based on the first correction information.

The inference part 4 infers a pixel signal on which noise that is not registered in the first correction information (noise caused by a pixel defect that occurs later or noise that occurs accidentally) is superimposed. The second correction part 6 corrects the noise inferred by the inference part 4. The inference part 4 detects a pixel signal on which noise is superimposed from the second image signal to which the correction based on the first correction information has been applied by the first correction part 2 and infers second correction information for correcting the noise. The noise inferred by the inference part 4 is noise such as RTN or a pixel defect that occurs later (noise that is not corrected by the first correction information) as described above.

As in the case of the first correction information, the second correction information includes at least identification information (for example, address information indicating a relative position in an image signal) of a defective pixel signal detected from an input image signal. Further, the second correction information may include a defect level of the inferred defective pixel, as in the case of the first correction information. Further, the second correction information may include an inference result concerning selection of peripheral pixels used for signal value interpolation, an inference result of a correction coefficient for correcting an inferred defective pixel signal, an inference result of an estimated signal value after correction.

The inference part 4 performs the inference by using a learned model (machine learned model) stored in the second storage part 5. FIGS. 3A and 3B are diagrams showing flow of data input/output using the learned model in the inference part 4.

In FIG. 3A, the inference part 4 performs inference processing by using a learned model 303 acquired from the second storage part 5. For example, the inference part 4 may acquire the learned model itself from the second storage part 5 or may acquire learned coefficient parameters applied to the learned model from the second storage part 5. It should be noted that a neural network (neural network system) has been applied to the learned model in FIG. 3.

The second image signal to which the correction based on the first correction information has been applied by the first correction part 2 is input to the learned model 303 as input data 301 for inference. The inference part 4 infers the second correction information from the input second image signal based on the learned model 303. Then, the learned model 303 corrects noise included in the second image signal based on the inferred second correction information and inputs the corrected image signal (inferred image signal) to a difference circuit 304 as output data 302.

The difference circuit 304 calculates a difference value of each pixel between the input data (second image signal) 301 that has not been corrected based on the second correction information and the output data 302 that has been corrected based on the second correction information and output the difference value as difference data 305.

A second correction information generation part 306 outputs, as output data 307, the second correction information including identification information of the defective pixel that is not registered in the first correction information based on the difference data 305.

For example, the second correction information generation part 306 detects, as a new defective pixel, one or more pixels that output a pixel signal whose difference value exceeds a predetermined threshold value in the difference data 305. The second correction information generation part 306 may generate information including identification information of the newly detected defective pixel as output data 307. In this case, a pixel whose difference value exceeds a predetermined threshold value is corrected by the second correction part 6.

FIG. 3B is another example of the inference part 4. In FIG. 3B, an inference part 4*b* does not have the difference circuit 304 and the second correction information generation part 306. The second image signal to which the correction based on the first correction information has been applied by the first correction part 2 is input, as input data 301 for inference, to a learned model 303*b* of the inference part 4*b*. The inference part 4*b* infers a defective pixel that has not been registered in the first correction information from the second pixel signal on which noise that is not registered in the first correction information (noise caused by a pixel defect that occurs later or noise that occurs accidentally) is superimposed. Then, the inference part 4*b* generates second correction information including identification information of the inferred new defective pixel and outputs the generated second correction information as output data 307.

In the examples of FIGS. 3A and 3B, an image signal input to the inference part 4, 4*b* may be a third image signal to which correction of a defective pixel signal based on the first correction information has not been applied by the first correction part 2 instead of the second image signal to which the correction based on the first correction information has been applied by the first correction part 2. In this case, the inference part 4, 4*b* can also infer a defective pixel signal that has not been corrected by the first correction part 2. As a result, a defective pixel signal that is normally corrected by the first correction part 2 is detected by the inference part 4, 4*b*. In this case, the image pickup apparatus 100 may be configured not to include the first correction part 2.

In FIG. 1, the second correction information inferred by the inference part 4 is associated with the second image signal and provided (output) to the second correction part 6 together with the second image signal. That is, the inference part 4 provides not only the estimated second correction information but also the second image signal used for the inference to the second correction part 6. The second correction part 6 performs similar processing (such as interpolation) to the first correction part 2 based on the provided second correction information and corrects the defective pixel signal of the second image signal.

The second correction pan 6 outputs the second image signal corrected based on the second correction information to the control part 7 for use in recording, display, and the like. The second storage part 5 stores therein the learned model 303 machine-learned by the machine learning part 8, which will be described later. As described above, the inference part 4 acquires the learned model 303 from the second storage part 5. The first storage part 3 and the second storage part 5 may be the same storage part (e.g., memory, storage) or may be separate storage parts.

The second correction part 6 corrects the second image signal based on the second correction information inferred by the inference part 4. The second correction part 6 corrects a pixel signal identified by the identification information included in the second correction information by a correction method such as substitution or interpolation using proximity pixel values. In FIG. 1, the first correction part 2 and the second correction part 6 may be a common circuit block or may be separate circuit blocks.

The machine learning part 8 performs machine learning of the learned model used for inference by the inference part 4. In the present embodiment, it is assumed that a neural network is used as the learned model. Therefore, the machine teaming part 8 performs deep learning using a neural network. However, the machine learning part 8 may perform machine learning by using any algorithm such as a nearest neighbor algorithm, a naive Bayes algorithm, a decision tree, or a support vector machine.

FIG. 4 is a diagram showing a flow of data input/output in the machine teaming part 8. The machine learning part 8 has a model 403, an error detection part 406, and an update part 407. The model 403 is a model for which the machine learning part 8 performs machine learning. The machine-learned model 403 becomes the learned model 303 of the inference part 4. Therefore, the same algorithm is applied to the model 403 of the machine learning part 8 and the learned model 303 of the inference part 4. The learned model 303 generated by the machine learning part 8 is stored in the second storage part 5.

The machine learning part 8 acquires, from the first correction part 2, the first correction information stored in the first storage part 3 together with an image signal (third image signal) before correction of the first image signal based on the first correction information. The machine learning part 8 performs machine learning of the model 403 by using the third image signal as input data 401 for learning and the first correction information as supervised data 404.

The third image signal may have been corrected as for noise other than a defective pixel signal that is the target of machine learning in the machine learning part 8. For example, the first correction part 2 may correct noise (shading) caused by offset variations and circuit gain variations resulting from variations of column circuits provided for respective pixel columns of the solid-state image pickup device 1 in the first image signal. The first correction part 2 may generate the third image signal by performing such correction.

In order for the first correction part 2 to perform the above correction, the first storage part 3 may store therein correction information for correcting offset variations and circuit gain variations resulting from variations of the column circuits in addition to the first correction information. In this case, the first correction pan 2 makes the above correction with reference to the correction information stored in the first storage part 3.

Further, for the purpose of improving detection accuracy of RTN, the first correction part 2 may generate the third image signal by correcting the first image signal depending on whether or not a difference between a value indicated by RTN and a defect level Lvi is equal to or larger than a certain value by referring to the defect level Lvi of the first correction information. For example, to generate the third image signal, the first correction part 2 may perform correction such as substitution or interpolation using pixel values of peripheral pixels on defective pixels whose difference is equal to or larger than the certain value and omit the correction as for defective pixels whose difference is less than the certain value.

The model 403 infers a pixel signal on which noise is superimposed by using the third image signal, which is the input data 401 for learning, as input and output, as output data 402, second correction information including identification information for identifying the inferred pixel signal. The error detection part 406 detects an error 405 (loss) between the output data 402 output by the model 403 and the supervised data 404.

The update part 407 updates the model 403 so that the error 405 detected by the error detection part 406 becomes small. In the present embodiment, since the model 403 is a neural network, the update part 407 updates the model 403 by adjusting coefficient parameters of the neural network so that the error 405 becomes small. For example, the update part 407 may update the model 403 by adjusting the coefficient parameters of the neural network by an error back propagation algorithm using a gradient descent method or the like.

As described above, the third image signal for which correction based on the first correction information has not been made on the first image signal output from the solid-state image pickup device 1 is used as the input data 401 for learning. That is, the first image signal, which is the input data 401, is an image signal on which noise caused by pixel defects is superimposed. Pixel defects occur in addresses in the first correction information. The machine learning part 8 can obtain the third image signal as the input data 401 for learning just by acquiring an image before the correction based on the first correction information from the first correction part 2. Therefore, the machine learning part 8 can acquire the input data 401 for learning easily without need for special processing (processing such as image signal processing and composition).

The third image signal, which is the input data 401, is an image signal in which noise caused by pixel defects remain superimposed on the addresses indicated by the first correction information. Therefore, the first correction information can be used as supervised data. This suppresses an inference error such as regarding a point image, a thin line, or the like included in a subject image as noise when inferring noise from an image signal including a subject image, thereby improving inference accuracy of the model 403.

Further, the first correction information is associated with the input data 401. Therefore, the machine learning part 8 can easily acquire the supervised data 404 by referring to the first correction information. It should be noted that in a case where the first correction part 2 determines necessity of correction of defective pixels in accordance with defect level information and shooting conditions of the first image signal, the supervised data 404 may be data including only information on a pixel signal determined to need correction in the first correction information.

A user or the like can perform shooting by setting any subject, composition, shooting conditions, and the like in the image pickup apparatus 100. The third image signal, which is an image signal before correction on the first image signal obtained by the shooting becomes the input data 401 input to the model 403. It is therefore possible to easily acquire input data 401 for learning of various subjects, compositions, shooting conditions, and the like. As a result, accuracy of inference using the learned model 303 can be improved.

The machine learning part 8 may be an independent device (learning device) including a CPU. However, a computation amount of machine learning performed by the machine learning part 8 is large. For example, in a case where the machine learning part 8 performs deep learning, a computation amount of a product-sum operation becomes very large. Therefore, the machine learning part 8 may be realized by a GPU (graphics processing unit) or may be realized by a CPU and a GPU.

The inference part 4 may be realized by any one of or both of a CPU and a GPU as in the case of the machine teaming part 8. In this case, the processing is preferably performed by cooperation of the CPU and the GPU. The inference pan 4 and the machine teaming part 8 may use common CPU and GPU. Instead of the GPU or together with the GPU, a circuit specialized for machine learning computation may be used.

The control part 7 shown in FIG. 1 generates and outputs a control signal for driving functional blocks of the image pickup apparatus 100 based on an instruction of the instruction pan 13. Further, the control part 7 generates an image signal for display, an image signal for recording, and the like by performing various kinds of processing (predetermined signal processing such as development and compression, processing such as data addition) on the image signal output by the second correction part 6.

The recording part 11 can record information on a predetermined recording medium. The recording medium may be detachable from the recording part 11 or may be undetachable from the recording part 11. The recording part 11 records an image signal for recording or the like that has been subjected to signal processing by the control part 7 on a recording medium. The recording medium may be, for example, a semiconductor memory such as a flash memory.

The display part 12 displays an image signal for display generated by the control part 7, various kinds of setting information of the image pickup apparatus, and the like. The instruction part 13 receives an instruction such as an instruction to execute shooting. The instruction is given by, for example, a user. The lens driving pan 9 drives the taking lens 10. The lens driving part 9 performs zoom control, focus control, aperture control, and the like in accordance with a control signal from the control part 7.

FIGS. 5A to 5D are functional block diagrams showing software functions of the pars of FIG. 1.

The solid-state image pickup device 1 outputs an image signal. An image signal generation part 511 generates an image signal. An image signal providing part 512 provides the generated image signal to the first correction part 2 as a first image signal.

An image signal receiving part 523 of the first correction part 2 receives the first image signal from the solid-state image pickup device 1. An image signal storage part 522 temporarily stores therein the received image signal. A correction information receiving part 525 receives the first correction information from the first storage part 3. A correction information storage part 521 temporarily stores therein the first correction information. An image signal correction part 524 corrects the first image signal stored in the image signal storage part 522 by referring to the first correction information received from the correction information storage part 521.

The image signal providing part 527 provides the machine learning part 8 with the third image signal before application of the correction based on the first correction information to the first image signal. Further, the image signal providing part 527 provides the inference part 4 with the second image signal corrected based on the first correction information. When a correction information providing part 526 provides the third image signal to the machine learning part 8, the correction information providing part 526 provides the first correction information to the machine learning part 8 in association with the third image signal.

The first storage part 3 stores therein the first correction information in advance. A correction information storage part 532 stores therein the first correction information for correcting the first image signal. A correction information providing part 531 provides the first correction information to the first correction part 2.

The inference part 4 infers noise to be corrected from the received second image signal and generates the second correction information for correcting the inferred noise. An image signal receiving part 543 receives the second image signal from the first correction part 2. An image signal storage part 542 temporarily stores therein the received second image signal. A model receiving part 547 receives the learned model from the second storage part 5.

A model storage part 548 temporarily stores therein the learned model. The model storage part 548 may store therein learned coefficient parameters. In this case, the model receiving part 547 receives the learned coefficient parameters from the second storage part 5.

An inference processing part 545 infers correction contents from the second image signal by using the received learned model and generates second correction information in accordance with the inferred correction contents. The inference contents include at least one of detection of noise to be corrected, selection or decision of a correction method, and inference of a correction coefficient.

A correction information storage part 541 temporarily stores therein the second correction information. An image signal providing part 544 provides the second image signal to the second correction part 6. A correction information providing part 546 provides the second correction part 6 with the second correction information inferred from the second image signal in association with the second image signal provided to the second correction part.

The second correction part 6 corrects the second image signal based on the second correction information. An image signal receiving part 563 receives the second image signal from the inference part 4. An image signal storage part 562 temporarily stores therein the received second image signal. A correction information receiving part 565 receives the second correction information from the inference part 4.

A correction information storage part 561 temporarily stores the received second correction information. An image signal correction part 564 corrects the second image signal stored in the image signal storage part 562 based on the second correction information stored in the correction information storage part 561. An image signal providing part 566 outputs the corrected image signal as an image signal for recording, an image signal for display, or the like.

The machine learning part 8 detects noise to be corrected from the input third image signal and performs machine learning for inferring the second correction information for correcting the detected noise. The machine learning part 8 performs machine learning by using the third image signal before application of correction based on the first correction information as input data for learning and using the first correction information as supervised data. Prior to machine teaming, an image signal receiving part 581 receives the third image signal from the first correction part 2. An image signal storage part 586 temporarily stores therein the third image signal.

A correction information receiving part 582 receives the first correction information from the first correction part 2. A correction information storage part 585 temporarily stores therein the received first correction information. A learning processing part 583 performs machine learning by using the third image signal stored in the image signal storage part 586 as input data and using the first correction information stored in the correction information storage part 585 as supervised data. In this way, a learned model is generated. A model providing part 584 provides the generated learned model to the second storage part 5. The model providing part 584 may provide the learned coefficient parameters to the second storage part 5 instead of the learned model itself.

The second storage part 5 stores therein the learned model learned by the machine learning part 8 and provides the learned model to the inference part 4. A model receiving part 553 receives the learned model from the machine learning part 8. A model storage part 552 stores therein the learned model. A model providing part 551 provides the learned model stored in the model storage part 552 to the inference part 4.

FIG. 6 is a flowchart showing a flow of processing of the first correction part 2, the machine learning part 8, the inference part 4, and the second correction part 6. The flow of processing of the first correction part 2 will be described with reference to FIG. 6A. It is assumed that the solid-state image pickup device 1 generates an image signal and outputs the image signal as a first image signal before the processing of FIG. 6A is performed. In step S721, the first correction part 2 receives the first image signal and the first correction information for correcting the first image signal. In step S722, the first correction part 2 determines whether a learning instruction has been given. For example, in a case where a learning instruction is given to the instruction part 13, the control part 7 outputs information indicating that the learning instruction has been given to the first correction part 2.

In a case where a result of the determination of the first correction part 2 is NO in step S722, the processing proceeds to step S724. For example, it is assumed that an image signal is acquired at a frame rate that exceeds a processing capacity of the machine learning part 8, for example, continuous shooting is instructed by the instruction part 13 at predetermined intervals or shorter intervals. In such a case, the control part 7 may give a learning instruction to the machine learning part 8 at frame intervals by which learning processing can be performed. In this case, not all frames (images) become learning targets, and some frames become learning targets. For example, some frames may be excluded from the learning target in consideration of the processing capacity of the machine learning part 8.

In a case where the result of the determination of the first correction part 2 is Yes in step S722, the processing proceeds to step S723. In step S723, the image signal providing part 527 associates the third image signal, which is the input data for learning, with the first correction information as the supervised data and provides the third image signal associated with the first correction information to the machine learning part 8.

In step S724, the image signal correction part 524 corrects the first image signal based on the first correction information. In step S725, the image signal providing part 527 provides the inference part 4 with the second image signal to which the correction based on the first correction information has been applied. Then, the processing of the first correction pan 2 is finished.

Next, the flow of processing of the machine learning part 8 will be described with reference to FIG. 6B. In step S781, the image signal receiving part 581 determines whether or not the third image signal and the first correction information have been received. In a case of NO in step S781, the machine learning part 8 ends the processing since machine learning is not performed.

In a case of Yes in step S781, the machine learning part 8 causes the learning processing part 583 to perform machine learning of the model 403 by using the third image signal as input and using the first correction information as supervised data, in step S782. In step S783, the learning processing part 583 performs machine learning so that the correction information inferred by the model 403 approaches the first correction information as supervised data.

The machine learning performed by the learning processing part 583 is completed when a predetermined condition is met. For example, when the learning amount of the model 403 reaches a predetermined amount, the learning processing part 583 may complete the machine learning. In step S784, the model providing part 584 provides the learned model 403 to the second storage part 5 as the learned model 303. The second storage part 5 stores therein the provided learned model 303. The processing of the machine learning part 8 is thus completed.

Next, the flow of processing of the inference part 4 will be described with reference to FIG. 6C. In step S741, the model receiving part 547 receives the learned model 303 from the second storage part 5. In step S742, the model storage part 548 stores the received learned model 303 in the model storage part 548. In step S743, the image signal receiving part 543 receives the second image signal from the first correction part 2.

In step S744, the inference processing part 545 inputs the received second image signal to the learned model as input data and infers the second correction information. In step S745, the image signal providing part 544 provides the second image signal to the second correction part 6, and the correction information providing part 546 provides the inferred second correction information to the second correction part 6 as an inference result. Then, the processing of the inference part 4 ends.

Next, the flow of processing of the second correction part 6 will be described with reference to FIG. 6D. In step S761, the image signal receiving part 563 receives the second image signal from the inference part 4, and the correction information receiving part 565 receives the second correction information from the inference part 4.

In step S762, the image signal correction part 554 corrects the second image signal based on the second correction information. In step S763, the image signal providing part 566 provides, as an image for recording or an image for display, the image signal corrected based on the second correction information to the recording part 11 or the display part 12.

As described above, in the present embodiment, the machine learning part 8 performs machine teaming by using, as input data for learning, the third image signal before correction of the first image signal picked up by the solid-state image pickup device 1 and using, as supervised data, the first correction information for identifying defective pixels registered in advance. Since the third image signal before correction can be acquired as a result of actual use of the image pickup apparatus 100, various kinds of input data for learning can be easily acquired without preparing input data for learning in advance.

Further, in the present embodiment, the first correction information for correcting the first image signal is registered in advance, and the first correction information that is registered in advance is used as supervised data for machine learning performed by the machine learning part 8. It is therefore unnecessary to prepare supervised data separately. It is therefore possible to easily acquire image data for learning for improving accuracy of inference of noise to be corrected.

In the above example, acquisition of learning data for learning detection of RTN or noise caused by a later pixel defect has been described. However, the present embodiment can also be applied to inference of streak-like or band-like noise generated along a pixel column or a pixel row. In this case, for example, correction information for correcting offset variations and circuit gain variations caused by variations of column circuits provided for respective pixel columns of the solid-state image pickup device 1 becomes supervised data. Then, a learned model may be generated by performing machine teaming of a model by using, as input, an image signal before application of the correction information and using the above supervised data.

Further, the first correction part 2 may be provided inside the solid-state image pickup device 1. In this case, an image pickup part including pixels is provided on a first substrate of the solid-state image pickup device 1. Further, the first correction part 2 may be provided on a second substrate which is different from the first substrate in the solid-state image pickup device 1. In this case, a configuration in which the first substrate and the second substrate are laminated can be adopted.

Further, the inference part 4 may be provided on a third substrate which is different from the first substrate and the second substrate in the solid-state image pickup device 1. In this case, a configuration in which the first substrate, the second substrate, and the third substrate are laminated can be adopted. The solid-state image pickup device 1, the first correction part 2, the first storage part 3, the inference part 4, the second storage part 5, the second correction part 6, the control part 7, and the machine learning part 8 may be provided on respective different substrates, which are laminated on one another.

Further, the first correction part 2 and the second correction part 6 may be integral with each other or may be separate from each other. Further, the inference part 4 may have the function of the machine learning part 8. The parts from the first correction part 2 to the machine learning part 8 in FIG. 1 may be separate hardware or may be integral hardware. For example, a part or all of the first correction part 2, the inference part 4, the second correction part 6, the control part 7, and the machine learning part 8 may be realized by different circuits, processors, or the like. Further, the control part 7 realized by a predetermined circuit may have the functions of the parts from the first correction part 2 to the machine learning part 8.

Second Embodiment

Figure 7:
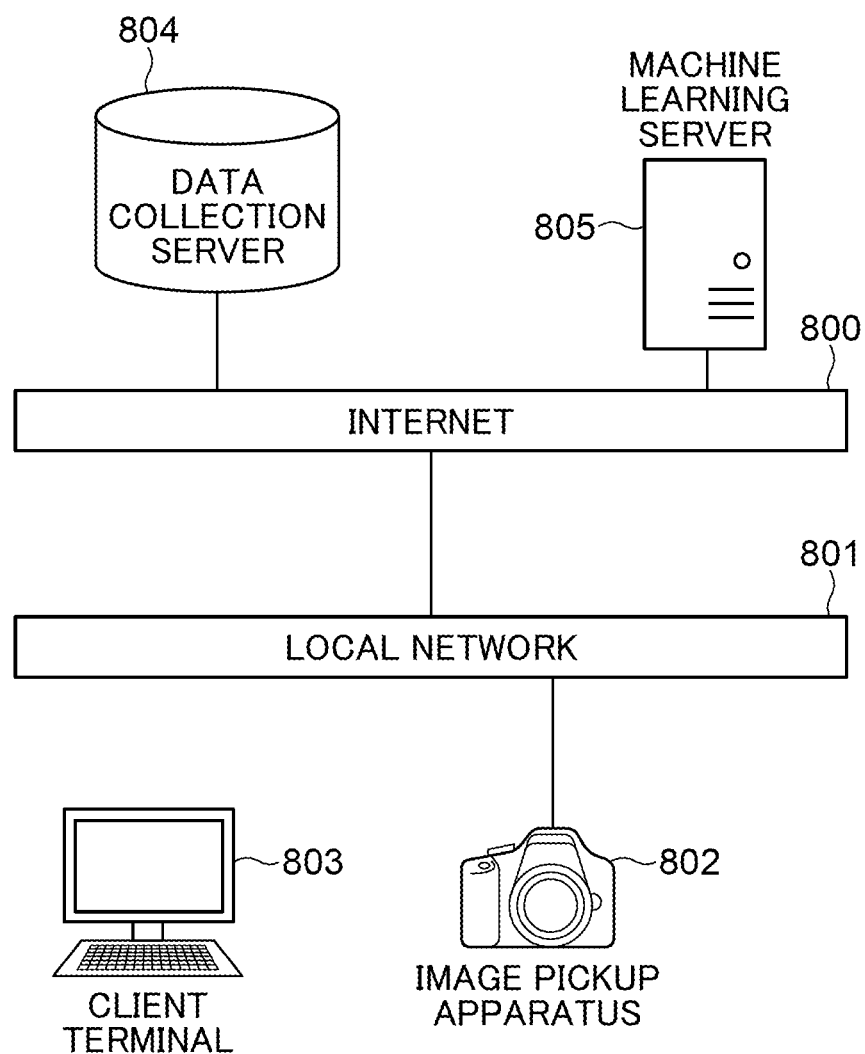
FIG. 7 is a block diagram showing a configuration of an image pickup system of the second embodiment.

Next, the second embodiment will be described. FIG. 7 is a block diagram showing a configuration of an image pickup system according to the second embodiment. The image pickup system includes an image pickup apparatus 802, a client terminal 803, a data collection server 804, and a machine learning server 805. The image pickup apparatus 802 is connected to a local network 801.

The image pickup apparatus 802 can communicate with the machine learning server 805 over the local network 801 and the Internet 809. The image pickup system also includes the client terminal 803 connected to the local network 801. Note that, the client terminal 803 need not be included in the image pickup system. The image pickup apparatus 802 may communicate with the client terminal 803, and the client terminal 803 may communicate with the machine learning server 805 and the data collection server 804.

Figure 8:
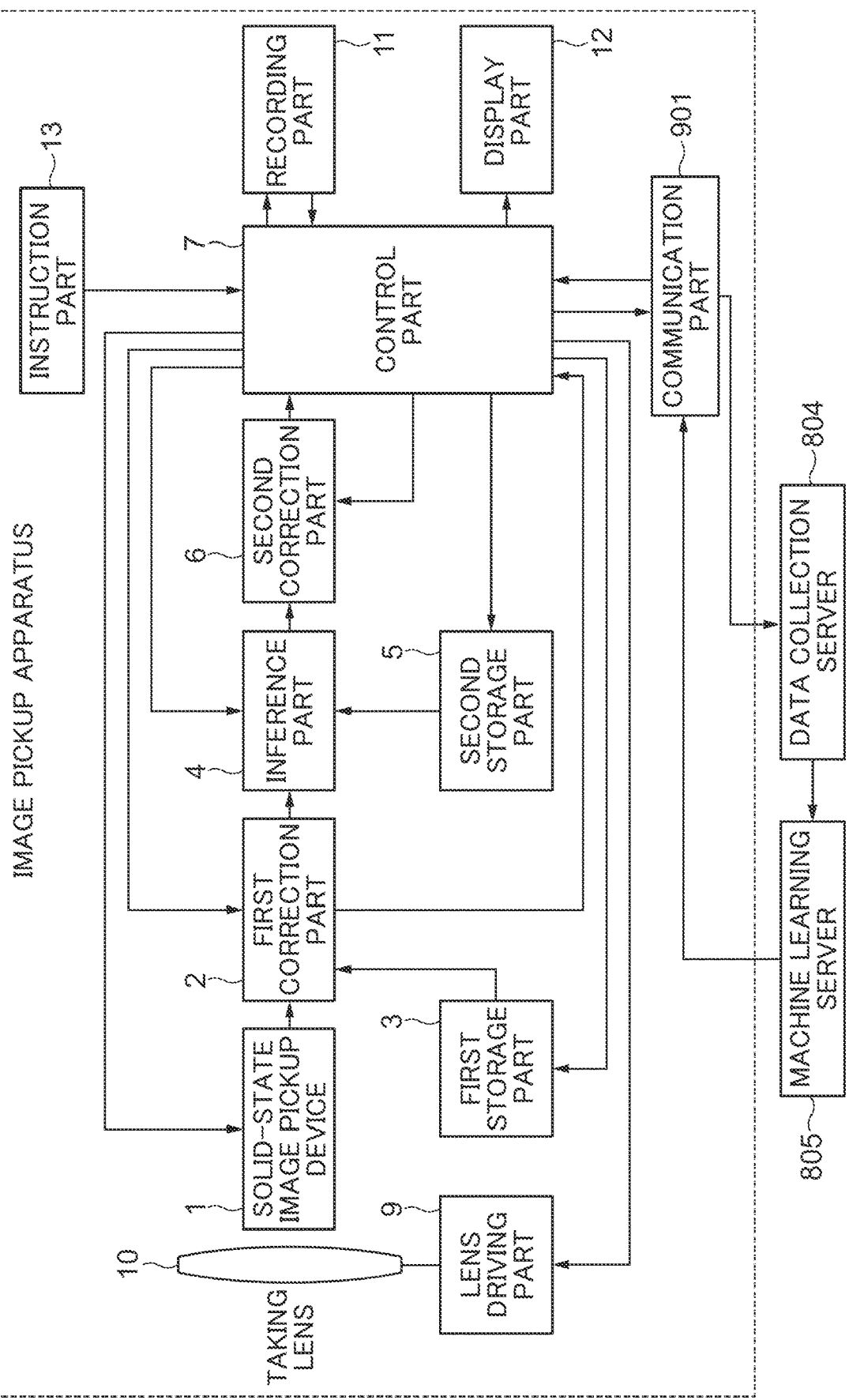
FIG. 8 is a block diagram showing a hardware configuration of an image pickup apparatus of the second embodiment.

FIG. 8 is a block diagram showing a hardware configuration of the image pickup apparatus 802 according to the second embodiment. A difference from the image pickup apparatus 100 according to the first embodiment is that a machine learning part 8 is provided outside the image pickup apparatus 802 as the machine learning server 805 and that the communication part 901 for communicating with an external device is provided in the image pickup apparatus 802. The communication part 901 is, for example, a communication interface that can be connected to an external network. The first correction part 2 provides, as input data for learning, a third image signal read out from the solid-state image pickup device 1 and to which correction based on the first correction information has not been applied to a control part 7.

The control part 7 adds individual identification information for identifying the image pickup apparatus 802 or the solid-state image pickup device 1 to the third image signal. The control part 7 controls the communication part 901 to transmit the third image signal to which the individual identification information has been added to the external data collection server 804.

The data collection server 804 stores therein in advance first correction information corresponding to pieces of individual identification information of a plurality of image pickup apparatuses or a plurality of solid-state image pickup devices. When the data collection server 804 receives the third image signal from the image pickup apparatus 802, the data collection server 804 specifies corresponding first correction information by referring to individual identification information given to the third image signal. Then, the data collection server 804 associates the specified first correction information with the received third image signal and transmits the first correction information associated with the third image signal to the machine learning server 805.

The machine learning server 805 is a learning device corresponding to the machine learning part 8 according to the first embodiment. The machine learning server 805 has a CPU, a RAM, a ROM, and the like. Further, the machine learning server 805 may have a GPU. The machine learning server 805 performs machine learning of a model by using, as input data for learning, the third image signal received from the data collection server 804 and using the first correction information associated with the image signal as supervised data. Machine learning is performed by the CPU, GPU, and the like of the machine learning server 805 described above. In this way, a learned model is generated. Note that, the machine learning server 805 may perform machine learning for each of the plurality of image pickup apparatuses.

The machine learning server 805 transmits the generated learned model to the image pickup apparatus 802. The machine teaming server 805 may transmit learned coefficient parameters to the image pickup apparatus 802 instead of the learned model itself. The learned model received from the machine learning server 805 is received by the communication part 901 of the image pickup apparatus 802 and sent to the control part 7.

The control part 7 stores the learned model in the second storage part 5. The inference part 4 infers a pixel signal to be corrected from the second image signal provided by the first correction part 2 by using the learned model stored in the second storage part 5.

As described above, even when the image pickup apparatus 802 does not have the machine learning part 8, similar effects to those of the first embodiment can be obtained. The image pickup apparatus 802 may be configured not to have the inference part 4. For example, the client terminal 803 may be an inference device that functions as the inference part 4. The client terminal 803 has a CPU, a RAM, a ROM, and the like. Further, the client terminal 803 may have a GPU. The client terminal 803 may be, for example, an edge computer. The client terminal 803 acquires the learned model from the machine learning server 805.

Further, the client terminal 803 acquires the second image signal from the image pickup apparatus 802. Then, the client terminal 803 performs inference processing using the learned model by using the second image signal as input and transmits the second correction information, which is an inference result, to the image pickup apparatus 802. The inference processing is performed by the CPU, GPU, or the like of the client terminal 803 described above. The second correction part 6 of the image pickup apparatus 802 can therefore perform correction by using the second correction information. In this case, the image pickup apparatus 802 does not have not only the function of the machine learning part 8 but also the function of the inference part 4.

Further, the image pickup apparatus 802 according to the second embodiment may be configured not to include the first correction part 2 and the first storage part 3. In this case, the inference part 4 performs inference by using the learned model and generates second correction information including correction information corresponding to the first correction information based on the inference result. The second correction part 6 corrects the third image signal based on the second correction information.

In this case, the second correction part 6 corresponds to a third correction unit. Therefore, correction processing based on the first correction information by the first correction part 2 can be omitted. It should be noted that the first correction information used as supervised data when the machine learning part 8 performs machine learning is stored in, for example, the second storage part 5. The above example can also be applied to the first embodiment.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-015074 filed on Jan. 31, 2020 which is hereby incorporated by reference herein in its entirety.

What is claimed is:

1. An image pickup apparatus comprising:
   a solid-state image pickup device including known pixels that emit pixel signals having noise superimposed thereon; and
   at least one processor or circuit configured to function as:
   a learning unit configured to:
      (i) input, to a model-to-be-learned, image data (i.a) that is acquired from the solid-state image pickup device and (i.b) that has not been corrected based on first correction information identifying the pixel signals, emitted from the known pixels, having the noise superimposed thereon,
      (ii) detect an error in an output of the model-to-be-learned by using the first correction information identifying the pixel signals, emitted from the known pixels, having the noise superimposed thereon as supervised data for correcting the output of the model-to-be learned, and
      (iii) update the model-to-be-learned based on the error in the output of the model-to-be learned detected using the first correction information identifying the pixel signals, emitted from the known pixels, having the noise superimposed thereon to thereby generate a learned model; and
   an inference unit configured to infer a pixel signal, emitted from a pixel of the solid-state image pickup device different from the known pixels, on which noise is superimposed by inputting image data, to the learned model, corrected based on the first correction information.

2. The image pickup apparatus according to claim 1, wherein
   the first correction information is information in which address information of a defective pixel to be corrected is registered in advance.

3. The image pickup apparatus according to claim 2, wherein
   predetermined correction is performed on a pixel signal of a pixel that is not the defective pixel among the pixels.

4. The image pickup apparatus according to claim 3, wherein
   the predetermined correction is correction of noise that occurs due to variations of column circuits of the solid-state image pickup device.

5. The image pickup apparatus according to claim 1, wherein the learning unit generates the learned model such that an error between the first correction information and second correction information, output when image data, corrected based on the first correction information, is input to the learned model, becomes small.

6. The image pickup apparatus according to claim 1, wherein the at least one processor or circuit is further configured to function as a first correction unit configured to correct an image output by the solid-state image pickup device by using the first correction information,
   wherein image data corrected by the first correction unit is input to the inference unit.

7. The image pickup apparatus according to claim 6, wherein
   the solid-state image pickup device, the first correction unit, and the inference unit are provided on respective different substrates, which are laminated on one another.

8. The image pickup apparatus according to claim 6, wherein
   the first correction unit determines a pixel signal to be corrected based on at least one of an accumulation time, a readout gain, and a temperature and corrects only a pixel signal determined as a pixel signal to be corrected by using the first correction information.

9. The image pickup apparatus according to claim 1, wherein the at least one processor or circuit is further configured to function as a second correction unit configured to correct image da that has been corrected based on the first correction information, based on second correction information for identifying a pixel signal inferred by the inference unit.

10. The image pickup apparatus according to claim 1, wherein the at least one processor or circuit is further configured to function as a third correction unit configured to correct image data that is acquired from the solid-state image pickup device and that has not been corrected based on the first correction information, based on second correction information for identifying a pixel signal inferred by the inference unit.

11. The image pickup apparatus according to claim 1, wherein
   the inference unit calculates a difference value in a pixel signal of each pixel between image data input to the learned model and image data based on a result of inference using the learned model and infers a pixel signal that exceeds the difference value as a pixel signal on which the noise is superimposed.

12. The image pickup apparatus according to claim 1, wherein
   a part of image data acquired from the solid-state image pickup device is excluded from a learning target in accordance with processing capability of the inference unit and a frame rate at which the image data is acquired.

13. An image pickup apparatus comprising:
a solid-state image pickup device including known pixels that emit pixel signals having noise superimposed thereon;
at least one processor or circuit configured to function as:
a communication unit configured to acquire a learned model from a learning device that is configured to:
  (i) input, to a model-to-be-learned, image data (i.a) that is acquired from the solid-state image pickup device and (i.b) that has not been corrected based on first correction information identifying the pixel signals, emitted from the known pixels, having the noise superimposed thereon,
  (ii) detect an error in an output of the model-to-be-learned by using the first correction information identifying the pixel signals, emitted from the known pixels, having the noise superimposed thereon as supervised data for correcting the output of the model-to-be learned, and
  (iii) update the model-to-be-learned based on the error in the output of the model-to-be learned detected using the first correction information identifying the pixel signals, emitted from the known pixels, having the noise superimposed thereon to thereby generate the learned model; and
an inference unit configured to infer a pixel signal, emitted from a pixel of the solid-state image pickup device different from the known pixels, on which noise is superimposed by inputting image data, to the learned model, corrected based on the first correction information.

14. An image pickup apparatus comprising:
a solid-state image pickup device including known pixels that emit pixel signals having noise superimposed thereon; and
at least one processor or circuit configured to function as:
a communication unit configured to acquire an inference result from an inference device that is configured to infer a pixel signal, emitted from a pixel of the solid-state image pickup device different from the known pixels, on which noise is superimposed by inputting an image data, to a learned model, corrected based on first correction information identifying the pixel signals, emitted from the known pixels, having the noise superimposed thereon, the learned model having been generated by a learning device configured to:
  (i) input, to a model-to-be-learned, image data (i.a) that is acquired from the solid-state image pickup device and (i.b) that has not been corrected based on the first correction information identifying the pixel signals, emitted from the known pixels, having the noise superimposed thereon,
  (ii) detect an error in an output of the model-to-be-learned by using the first correction information identifying the pixel signals, emitted from the known pixels, having the noise superimposed thereon as supervised data for correcting the output of the model-to-be learned, and
  (iii) update the model-to-be-learned based on the error in the output of the model-to-be learned detected using the first correction information identifying the pixel signals, emitted from the known pixels, having the noise superimposed thereon to thereby generate the learned model.

15. A learning device comprising:
at least one processor or circuit configured to function as
a learning unit configured to:
  (i) input, to a model-to-be-learned, image data (i.a) that is acquired from a solid-state image pickup device including known pixels that emit pixel signals having noise superimposed thereon and (i.b) that has not been corrected based on first correction information identifying the pixel signals, emitted from the known pixels, having the noise superimposed thereon,
  (ii) detect an error in an output of the model-to-be-learned by using the first correction information identifying the pixel signals, emitted from the known pixels, having the noise superimposed thereon as supervised data for correcting the output of the model-to-be learned,
  (iii) update the model-to-be-learned based on the error in the output of the model-to-be learned detected using the first correction information identifying the pixel signals, emitted from the known pixels, having the noise superimposed thereon to thereby generate a learned model.

* * * * *